US012812275B2

(12) United States Patent
Khotimsky et al.

(10) Patent No.: US 12,812,275 B2
(45) Date of Patent: Nov. 24, 2026

(54) SYSTEMS AND METHODS FOR FLEXIBLE PERFORMANCE MONITORING DATA ARCHIVING IN PASSIVE OPTICAL NETWORKS

(71) Applicant: Verizon Patent and Licensing Inc., Basking Ridge, NJ (US)

(72) Inventors: Denis A. Khotimsky, Westborough, MA (US); David J. Baker, Mechanicsville, VA (US); Gregory K. Sherrill, Herndon, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 334 days.

(21) Appl. No.: 18/437,387

(22) Filed: Feb. 9, 2024

(65) Prior Publication Data

US 2025/0260915 A1 Aug. 14, 2025

(51) Int. Cl.
*H04B 10/07* (2013.01)
*H04Q 11/00* (2006.01)

(52) U.S. Cl.
CPC ......... *H04Q 11/0067* (2013.01); *H04B 10/07* (2013.01); *H04Q 2011/0083* (2013.01); *H04Q 2011/0096* (2013.01)

(58) Field of Classification Search
CPC ..................................................... H04B 10/07
See application file for complete search history.

(56) References Cited

U.S. PATENT DOCUMENTS

2005/0163504 A1* 7/2005 Bernard ............. H04Q 11/0067 398/33
2005/0185631 A1* 8/2005 Bernard ............... H04B 10/272 370/503
2009/0034411 A1* 2/2009 Bernard ............. H04Q 11/0067 370/221
2012/0045201 A1* 2/2012 Skubic ................. H04B 10/272 398/38

* cited by examiner

*Primary Examiner* — Nathan M Cors

(57) ABSTRACT

A device may include a processor. The processor may be configured to, when an Optical Network Unit (ONU) timer reaches an ONU time interval: obtain a value from a history register, in an ONU, which stores a first sum of performance monitoring data at the end of a prior ONU time interval, by issuing a first ONU Control Interface (OMCI) command to the ONU; and store, in a bin accumulation register, the obtained value. Additionally, the processor may be configured to, when a collection timer reaches a collection time interval: obtain a second sum of performance monitoring data collected by the ONU after the prior ONU time interval, by issuing a second OMCI command to the ONU; adjust a result of subtracting a reference value, stored in a reference register, from the second sum; and store the adjusted result.

20 Claims, 9 Drawing Sheets

300

600

900

SYSTEMS AND METHODS FOR FLEXIBLE PERFORMANCE MONITORING DATA ARCHIVING IN PASSIVE OPTICAL NETWORKS

BACKGROUND INFORMATION

A Passive Optical Network (PON) is an optical access network that employs a point-to-multipoint (P2MP) optical fiber topology, called an optical distribution network (ODN), to connect Optical Line Termination (OLT) equipment located at the central office (central node) with multiple Optical Network Unit (ONU) equipment at the customer premises (leaf nodes). An ODN may include optical fibers and passive optical components, such as splitters and combiners. The term ONU may be used interchangeably with Optical Network Terminal (ONT).

DETAILED DESCRIPTION

The following detailed description refers to the accompanying drawings. The same reference numbers in different drawings may identify the same or similar elements.

Systems and methods described herein relate to flexible performance monitoring data archiving. A typical system for archiving performance monitoring data collected from optical network units (ONUs) operates under one or more constraints. For example, an archiving system at a central office may obtain data from ONUs and store the data at fixed, preconfigured time intervals. Archiving performance monitoring data at the fixed time intervals (e.g., 15-minute time intervals), however, may not provide sufficient data granularity for troubleshooting, data analysis, meeting performance evaluation objectives, and/or comparing performances of ONUs over different time scales. The systems and methods described herein permit the network operator to set the archiving times to occur at time intervals set by the network operator, not only at the preconfigured, fixed time intervals.

Figure 1:
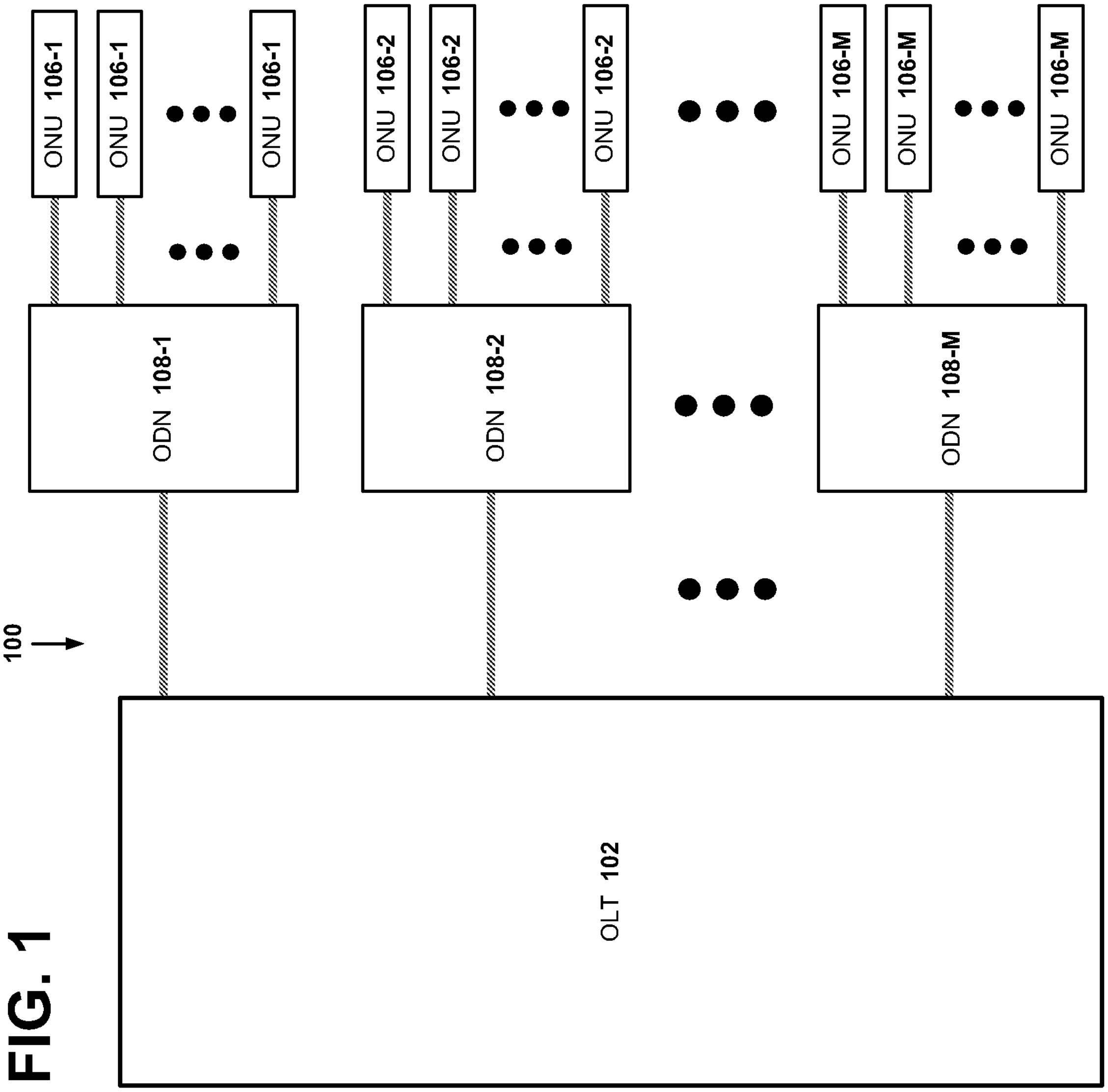
FIG. 1 illustrates an example passive optical network (PON) environment in which systems and methods described herein may be implemented.

FIG. 1 illustrates an example passive optical network (PON) environment 100 in which systems and methods described herein may be implemented. As illustrated, PON environment 100 may include an optical line termination equipment (OLT) 102, ONUs 106-1 through 106-M (collectively referred to as ONUs 106 and generically as ONU 106), and Optical Distribution Networks (ODNs) 108-1 through 108-M (collectively ODNs 108 and generically ODN 108). Depending on the implementation, PON environment 100 may include additional, fewer, different, or a different arrangement of components than those illustrated in FIG. 1 (e.g., optical splitters).

OLT 102 may act as optical signal distribution points for passive optical networks and as uplink points for other networks. OLT 102 may convert signals of a particular type (e.g., electrical signals) to optical signals of one or more wavelengths, multiplex the optical signals, and transmit the multiplexed optical signals to ONUs 106 over PONs 108. Additionally, OLT 102 may receive optical signals from ONUs 106 over ODNs 108, demultiplex the optical signals (e.g., demultiplex them in time domain), and convert them to signals of another type. OLT 102 may include components of systems for flexible archiving of performance monitoring data collected from ONUs 106. Such components permit the archiving times to occur at time intervals set by the network operator, not only at the fixed time intervals associated with ONUs 106.

ONUs 106 (also referred to as optical network terminals (ONTs)) may include termination points (e.g., interfaces) of ODNs 108 for end users. For example, an ONU 106 may select an optical signal of a given wavelength (e.g., discard optical signals in channels associated with other wavelengths) from OLT 102, convert the selected optical signal into an electrical signal that may feed into another device (e.g., a customer premises equipment (CPE) device) in a network local to the end user. In addition, ONU 106 may receive signals of a given type from a local network (e.g., CPE device), convert them into optical signals, multiplex them in time domain, and transmit the multiplexed optical signals upstream toward OLT 102. In one implementation, an ONU 106 may obtain performance monitoring data and forward the performance monitoring data to OLT 102 at predetermined time intervals.

Each ODN 108 may include one or more passive optical components, such as optical splitters and optical fibers. At the upstream end, ODN 108 may include a single fiber interface to OLT 102; and at the downstream ends, ODN 108 may include multiple fiber interfaces to ONUs 106, where each fiber corresponds to a particular ONU 106. Each PON that includes ODN 108 may be implemented as a single-channel PON, for example GPON, or a multichannel PON, for example, NG-PON2

Although PON environment 100 may include components other than those discussed above, they are not illustrated in FIG. 1 for clarity. In addition, depending on the implementation, PON environment 100 may include additional, fewer, different, or a different arrangement of components than those illustrated in FIG. 1. For example, in some implementations, OLT 102 may include optical wave division multiplexers (WDMs).

Figure 2:
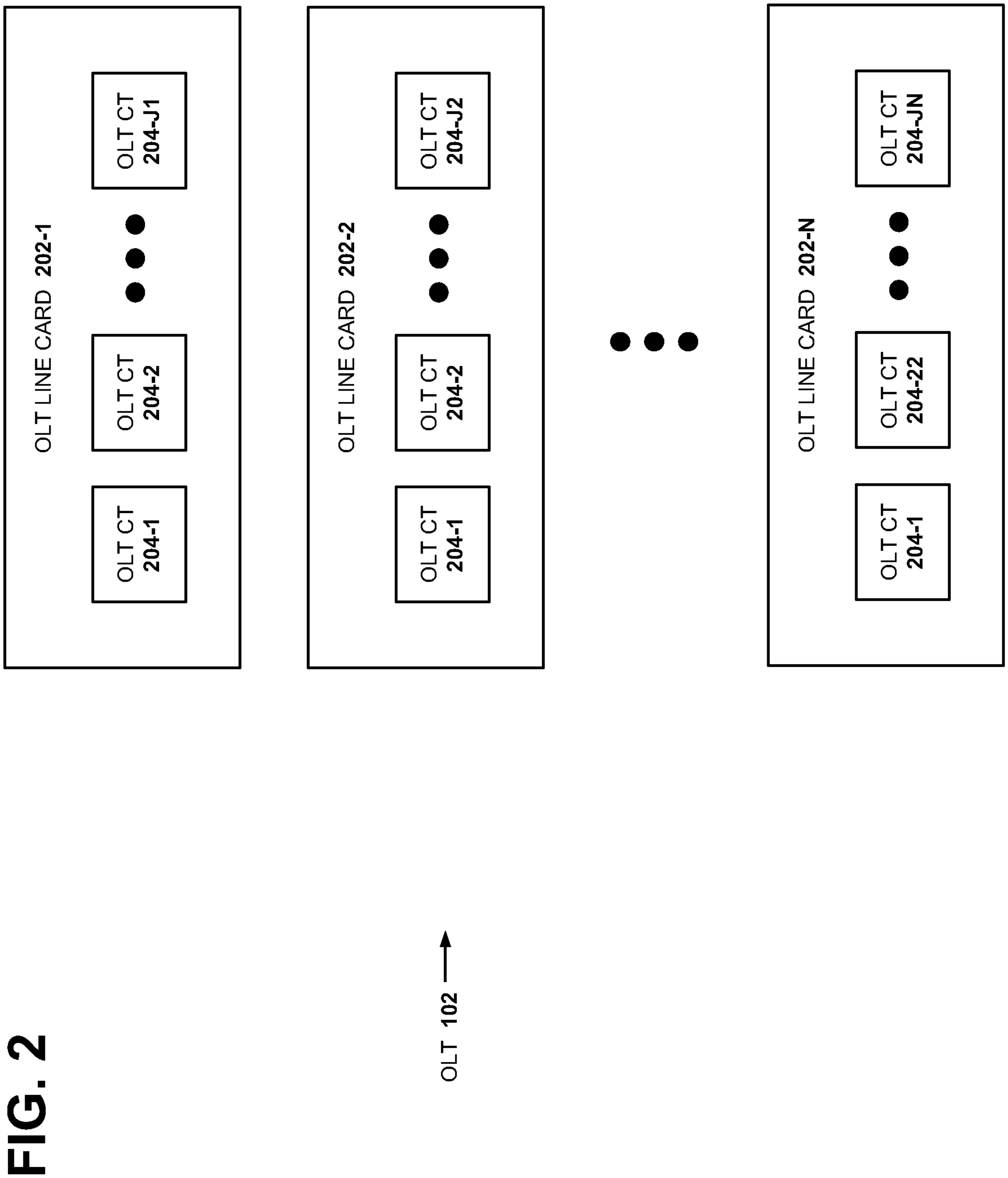
FIG. 2 shows example components of optical line terminal (OLT), according to an implementation.

FIG. 2 shows example components of OLT 102 according to an implementation. As shown, OLT 102 may include OLT line cards 202-1 through 202-N (collectively referred to as OLT line cards 202 and generically as OLT line card 202). Furthermore, each OLT line card 202 may include OLT channel terminations (CTs) 204-1 through 204-JN, where 1≤JN≤X and where X is the maximum number of OLT CTs per OLT line card 202. Although OLT 102 and/or OLT line card 204 may include other components, for clarity, they are not depicted in FIG. 2.

Each OLT CT 204 may perform functions that are associated with processing uplink and downlink optical signals in a single channel (defined by a particular wavelength) and functions for performing flexible performance monitoring data archiving. In particular, OLT CT 204 may implement an ONU Management and Control Interface (OMCI). OLT CT 204 may request performance monitoring data from ONUs 106 via the OMCI commands.

Depending on the implementation, a set of OLT CTs 204 in the same or different OLT chassis may be configured to handle ONUs 106 in a single channel PON environment or to handle ONUs 106 in a multichannel PON environment. For example, the set may comprise OLT CTs 204 that are included in different OLT line cards 202 of the same OLT 102. In another implementation, the set may comprise two or more OLT CTs 204 that are included in the same OLT line card 202. In yet another implementation, the set may comprise OLT CTs 204 that are included in OLT line cards 202 in different OLT chassis.

Figure 3:
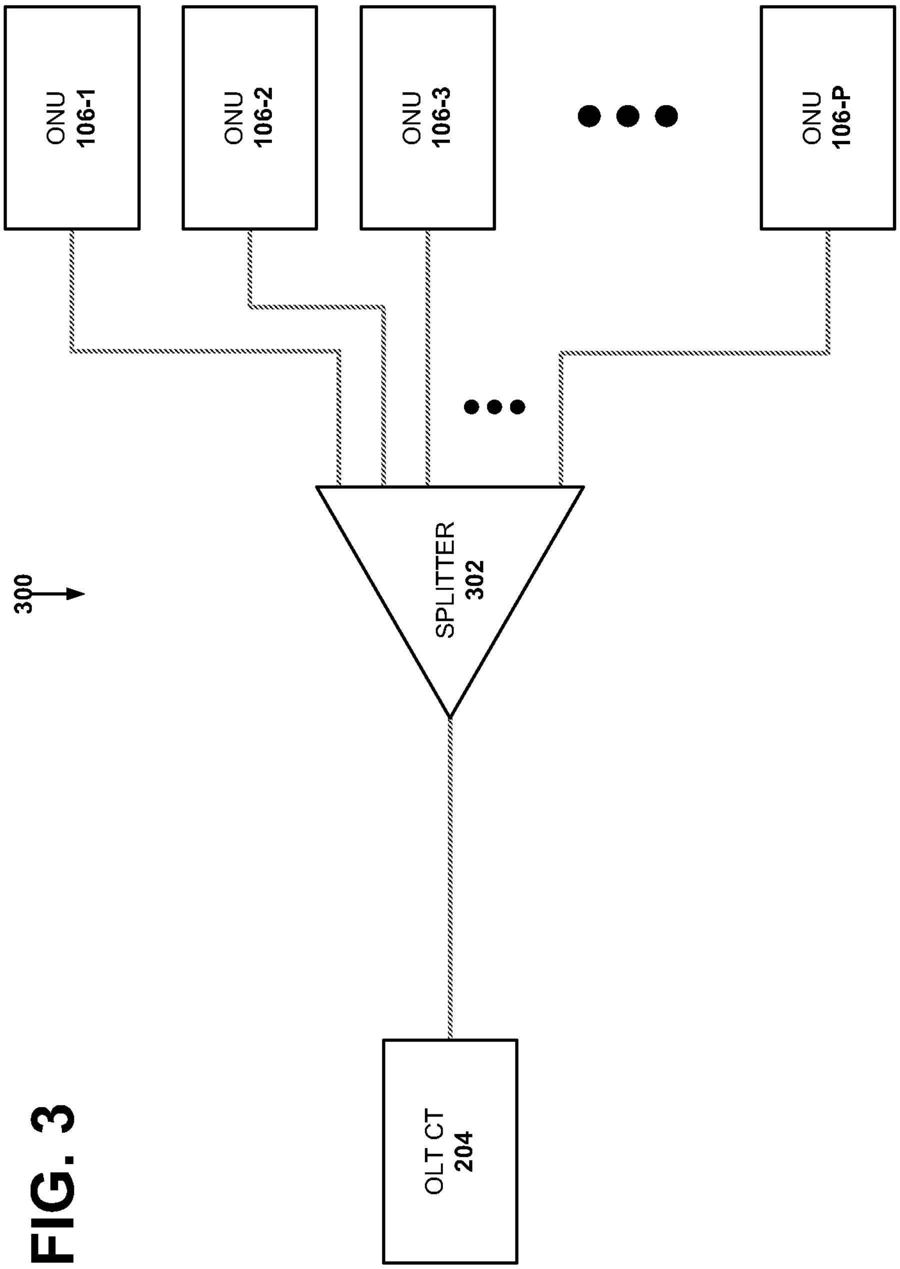
FIG. 3 depicts example interconnectivity between an OLT channel termination (CT) and optical network units (ONUs) in a single channel PON, according to an implementation.

FIG. 3 depicts example interconnectivity between OLT CT 204 and ONUs 106 in a single channel PON, according to an implementation. As shown, a single-channel PON may be terminated at the upstream single-fiber end by a time division multiplexed OLT CT 204 (referred to as TDM OLT CT 204 or simply as OLT CT 204) and terminated at the downstream multi-fiber ends by ONUs 106. As discussed above, in addition to performing various PON functions, OLT CT 204 may obtain performance monitoring data from ONUs 106 at network operator specified collection intervals, archive the obtained performance monitoring data, and/or present the obtained performance monitoring data to the network operator.

When an optical signal from OLT CT 204 travels down the optical fiber, the optical signal may be split into identical, multiple optical signals via one or more of optical splitter 302 (referred to simply as splitter 302). Each of the output split signals eventually reach ONUs 106 coupled to the ends of the optical fibers from a splitter 302. Conversely, uplink optical signals from ONUs 106 may be combined via one or more of splitter 302 and travel upstream over the single optical fiber that feeds OLT CT 204. The optical signals from ONUs 106 may be at a wavelength different from that of optical signals from OLT CT 204. In addition, the optical signals from ONUs 106 may be time division multiplexed, to avoid inter-ONU signal interference.

Figure 4:
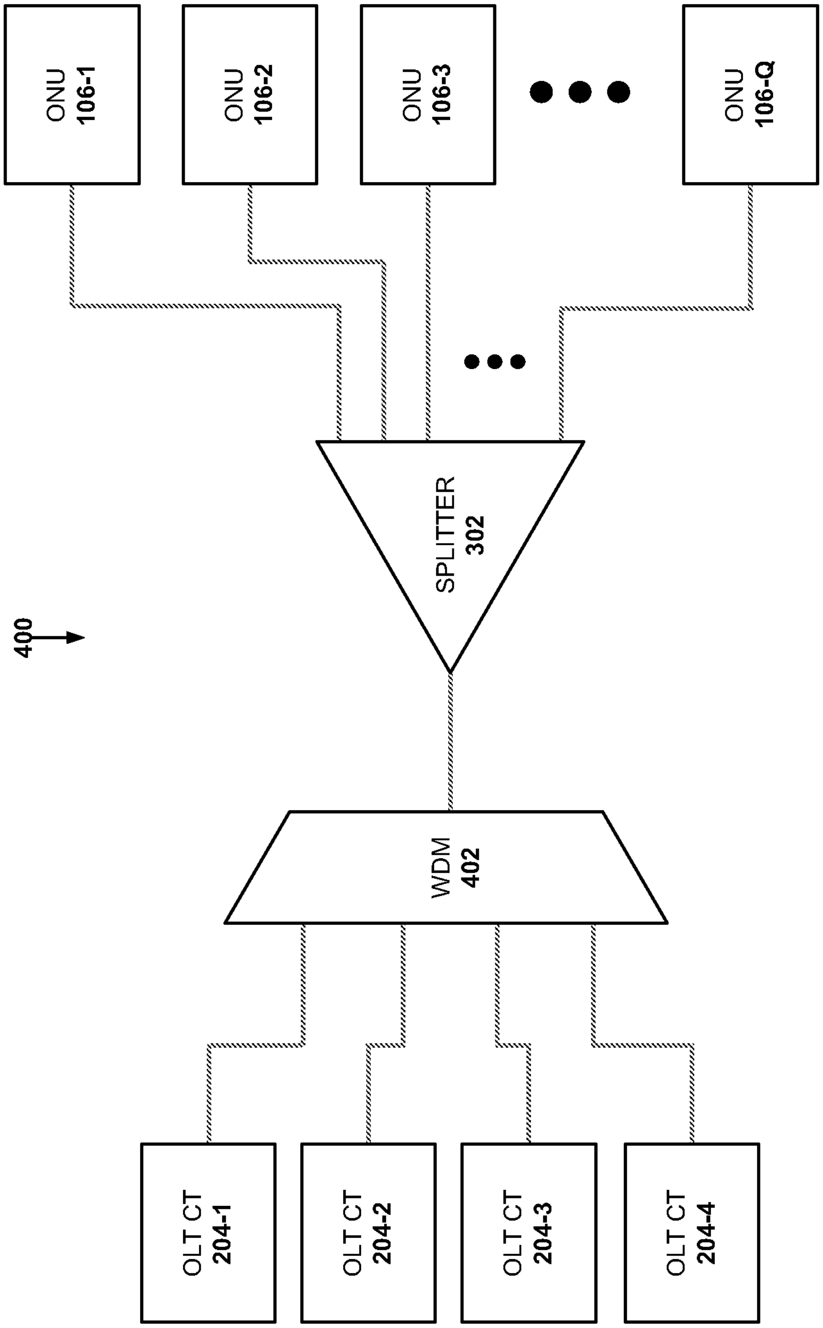
FIG. 4 depicts example interconnectivity between OLT CT devices and ONUs in a multichannel PON, according to an implementation.

FIG. 4 depicts example interconnectivity between OLT CT 204 and ONUs 106 in a multichannel PON, according to an implementation. In contrast to single channel PON, multichannel PON may be terminated at the upstream single-fiber end by time and wave division multiplexed OLT CTs 204 (referred to as TWDM OLT CT 204 or simply as OLT CT 204) and terminated at the downstream multi-fiber ends by ONUs 106. As discussed above, in addition to performing various PON functions, OLT CTs 204 may obtain performance monitoring data from ONUs 106 via the OMCI interface, archive the obtained performance monitoring data, and/or present the obtained performance monitoring data to a network operator.

In a multichannel PON, before optical signals from OLT CTs 204 are sent over the single optical fiber, they are wave division multiplexed via wave division multiplexer (WM) 402. The signals output from WDM 402 are then carried to splitter 302, which has been described above with reference to FIG. 3. Because a multichannel PON carries optical signals at various wavelengths, each OLT CT 204 and the corresponding ONUs 106 managed by the OLT CT 204 may be configured to select and process optical signals in a channel associated with a particular wavelength. For example, assume that OLT CT 204-1 transmits optical signals to ONU 106-1 via WDM 402. ONU 106-1 may receive the optical signals on the channel to which ONU 106-1 is tuned. Similarly, optical signals from ONUs 106 managed by OLT CT 204-1 may be on a channel different from those of other ONUs 106.

Figure 5:
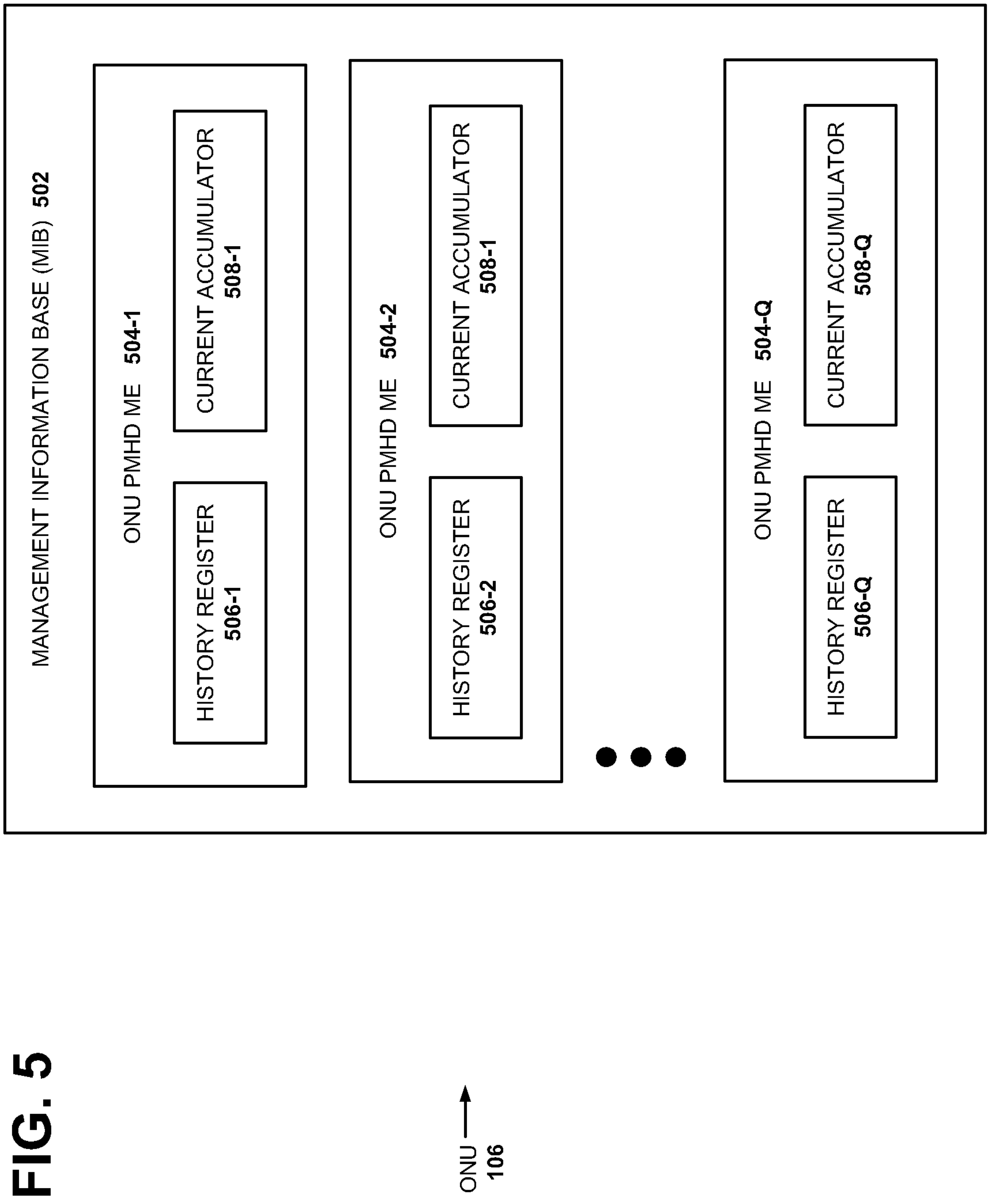
FIG. 5 shows example components of an ONU, according to an implementation.

FIG. 5 shows example components of ONU 106 for obtaining performance monitoring data, according to an implementation. As shown, ONU 106 may include a Management Information Base (MIB) 502, which in turn may include ONU Performance Monitoring History Data (PMHD) Managed Entities (MEs) 504-1 through 504-Q (collectively referred to as ONU PMHD MEs 504 and generically as ONU PMHD ME 504). The number of ONU PMHD ME 504 may correspond to the number of parameters that ONU 106 monitors. Although ONU 106 may include components and subcomponents other than MIB 502 and ONU PMHD MEs 504 (e.g., optical components or electrical components), such components/subcomponents are not shown in FIG. 5 for clarity.

MIB 502 may include information that OLT 102 (e.g., OLT CT 204) may access via OMCI messages, such as data maintained by ONU PMHD ME 504. Each ONU PMHD ME 504 may include a history register 506 and a current accumulator 508. History register 506 may include, during a data collection time interval, the accumulated sum of the data, in current accumulator 508 at the end of the preceding collection time interval.

Current accumulator 508 may also store a running sum of particular monitoring data (e.g., a number of packets received, transmitted, number of errors, etc.) from the start of the current collection time window to the present. Current accumulator 508 may continue to accumulate monitored data until the collection period expires.

History register 506 and current accumulator 508 may be configured to optimize performance. For example, at the expiration of a collection period, history register 506 may be set to zero and current accumulator 508 and history register 506 may swap roles. Without the optimization, at the start of each collection period, the value stored at current accumulator 508 would need to be transferred to history register 506 and current accumulator 508 would need to be reset to zero. With the optimization, only the contents of history register 506 (which immediately becomes current accumulator 508) has to be set to zero, thereby saving at least one instruction cycle.

Figure 6:
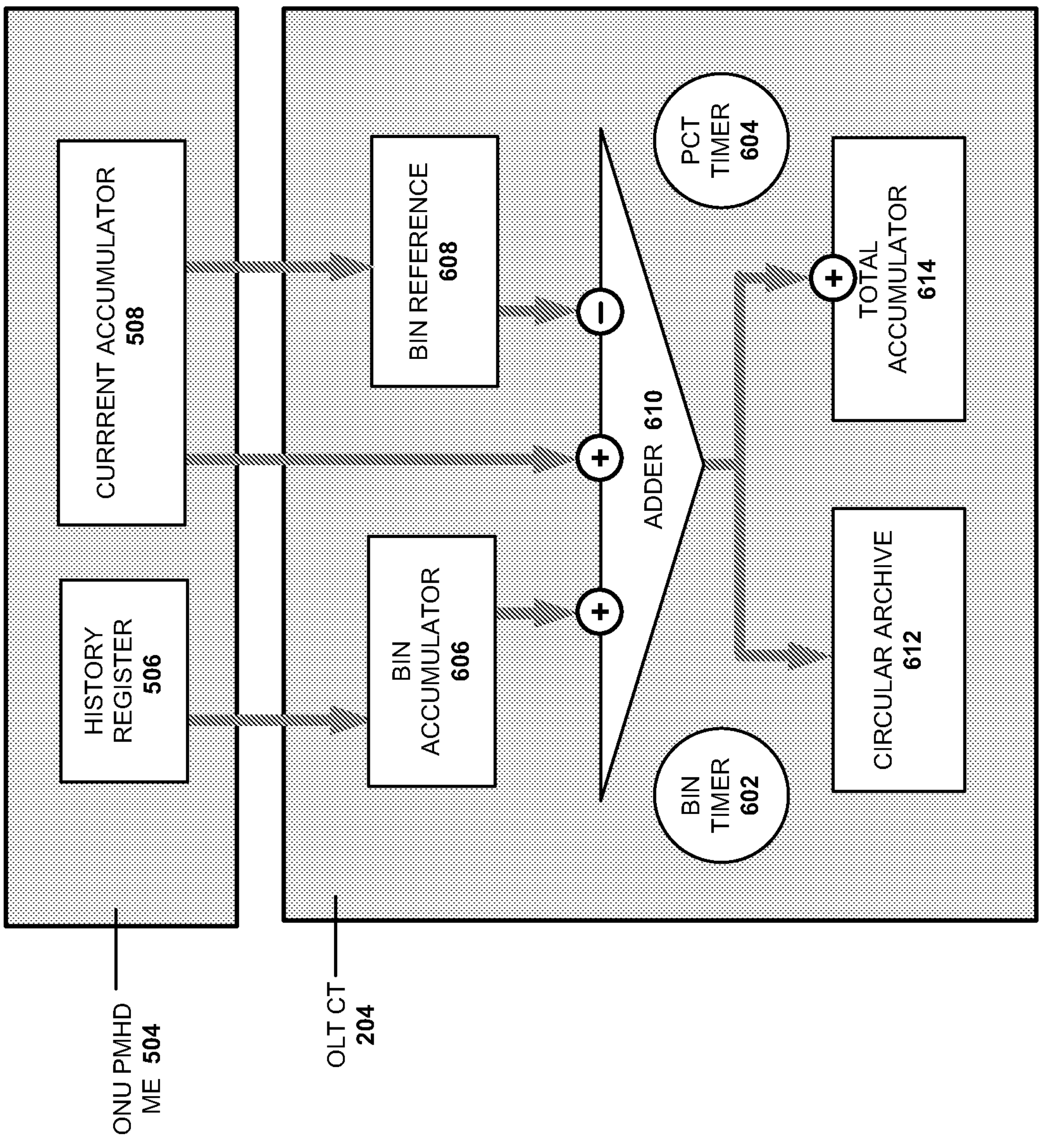
FIG. 6 illustrates example components of an OLT CT, according to an implementation.

FIG. 6 illustrates example components of an OLT CT 204 for flexible archiving of performance monitoring data, according to an implementation. FIG. 6 also shows components of ONU 106. OLT CT 204 and ONU 106 may interact over ODN 108, which is not shown in FIG. 6. As depicted, OLT CT 204 may include, for flexible archiving, a bin timer 602, a Preconfigured Collection Time (PCT) timer 604, a bin accumulator 606, a bin reference register 608 (or simply bin reference 608), an adder 610, a circular archive 612, and a total accumulator 614. These components are implemented to support archiving of performance monitoring data at network operator selected time intervals, herein referred to as bin intervals, and not at PCT intervals.

Although OLT CT 204 may include other components, such components are not shown in FIG. 6. Furthermore, in other implementations, OLT CT 204 may include additional, fewer, different, or a different arrangement of components for performance monitoring data archiving than those illustrated in FIG. 6. For example, OLT CT 204 may instantiate an additional set of components 602-610 and 614 for each additional ONU PMHD ME 504 that OLT CT 204 manages. Depending on the implementation, OLT CT 204 may share circular archive 612 for storing data from multiple ONU PMHD MEs 504, share circular archive 612 with other OLT CTs 204, or maintain an individual circular archive 612 for each ONU PMHD ME 504.

Bin timer 602 may track elapsed time starting from the prior end of a time window (a bin collection period) that spans a bin interval. When bin timer 602 reaches the end of the current bin collection period, bin timer 602 may alert OLT CT 204 that the current bin collection period has expired. Similarly, PCT timer 604 may track elapsed time starting from the prior end of a PCT collection period. When PCT timer 604 reaches the end of the current PCT collection period, PCT timer 604 may alert OLT CT 204 that the current PCT collection window has expired. Bin timer 602 and PCT timer 604 are automatically reset (e.g., set to zero) at their expiry (e.g., the timer reaches the end of the interval).

Bin accumulator 606 may store the value of history register 506 at the end of a PCT collection period. In addition, bin accumulator 602 may be set to zero at the end of a bin collection period. Bin reference 608 may store the value of current accumulator 508 at each expiration of a bin collection period.

Adder 610 may provide a result of adding the values of bin accumulator 606 and current accumulator 508, less the value of bin reference 608 and provide the result to circular archive 612 and total accumulator 614. Circular archive 612 may store, in a chronological manner, records of the outputs from adder 610. Each of the records may include an output provided by adder 610 along with a timestamp, an identifier (ID) associated with ONU 106 managed by OLT CT 204, an ID of OLT CT 204, the time interval during which the data was collected, etc. When a storage space allocated for circular archive is exhausted, circular archive 610 may overwrite the archived data, starting from the earliest record. Total accumulator 614 may store the sum of the output from adder 610 and the prior value of total accumulator 614.

Figure 7:
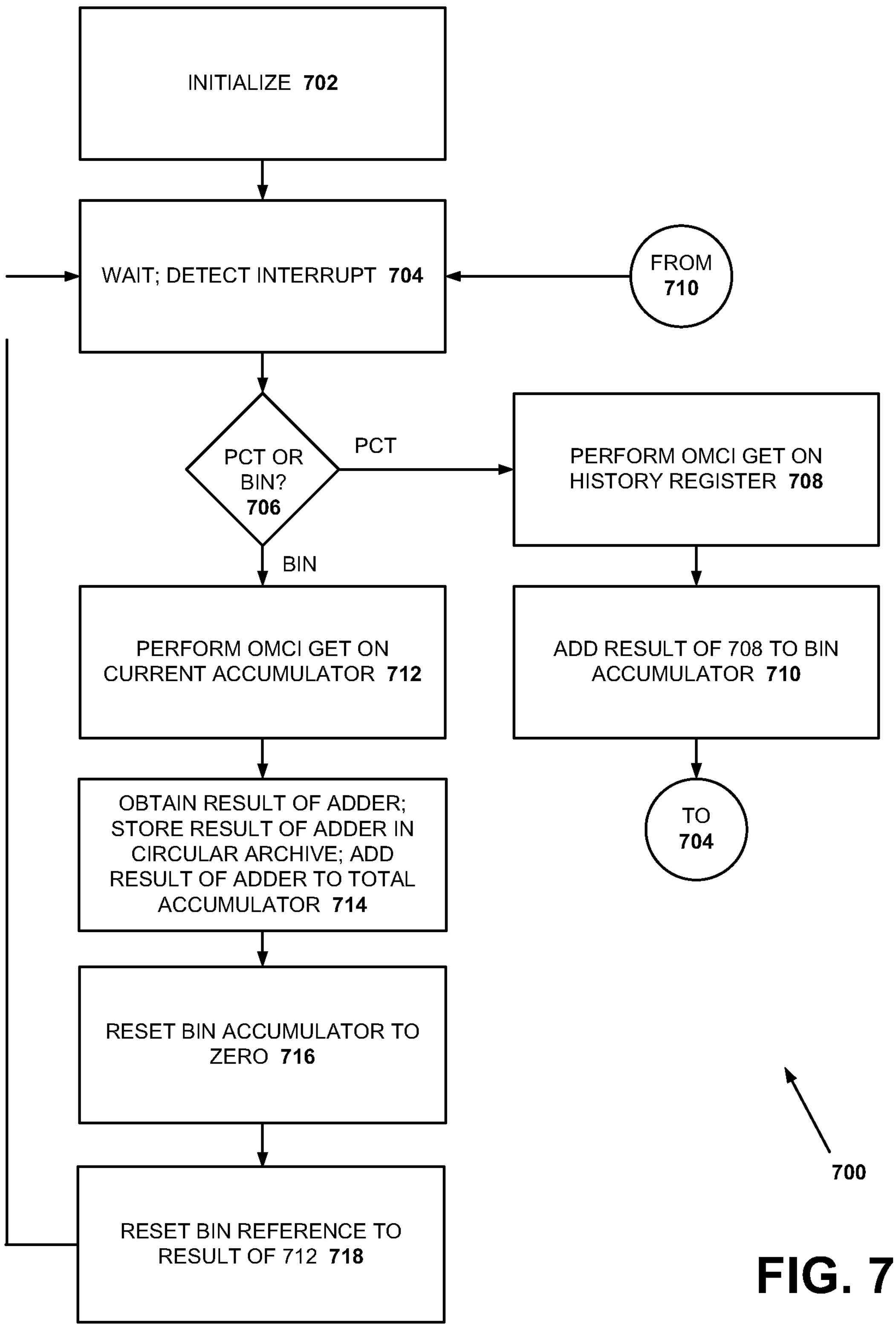
FIG. 7 is a flow diagram of an example process that is associated with flexible performance monitoring data archiving, according to an implementation.

FIG. 7 is a flow diagram of an example process 700 that is associated with components of OLT CT 204 for flexible performance monitoring data archiving, according to an implementation. Assume that ONU 106 stores a count of occurrences of particular events (e.g., packet errors) in current accumulator 508 and stores, in history register 506, the prior value of current accumulator 508 at the end of the PCT collection period. Also, assume that the network operator has set a bin interval to a value smaller than the PCT interval.

As shown, process 700 may include initialization of registers, accumulators, and archives (block 702). For example, OLT CT 204 may set bin accumulator 606 to zero, the bin reference 608 to zero, delete or remove all records from circular archive 612, set total accumulator 614 to zero, and reset bin timer 602 and PCT timer 604. In addition, OLT CT 204 may issue OMCI commands to ONU PMHD ME 504 to set history register 506 and current accumulator 508 to zero.

Process 700 may further include waiting for an interrupt to be generated by bin timer 602 upon reaching the bin interval or by PCT timer 604 upon reaching the PCT interval (block 704); and, after waiting, being interrupted or detecting an interrupt (block 704). When the interrupt generated, if the interrupt is has been generated by PCT timer 604 indicating that it has expired (block 706: PCT), OLT CT 204 may issue an OMCI command (e.g., OMCI GET message) to ONU 106 to obtain the value of history register 506 within ONU PMHD ME 504 (block 708). Next, OLT CT 204 may set bin accumulator 606 to the obtained value from history register 506 (block 710). Process 700 may then proceed to block 704.

At block 706, if the interrupt has been generated by bin timer 602 (block 706: BIN), OLT CT 204 may obtain the value of current accumulator 508 from ONU PMHD ME 504 by performing the OMCI GET on current accumulator 508 of ONU PMHE ME 504 (block 712). Next, OLT CT 204 may obtain an output value of adder 610 (i.e., evaluate the sum of the value obtained from current accumulator 608 at block 712 and the value of bin accumulator 606, less the value of bin reference 608 (block 714). OLT CT 204 may store the output of adder 610 along with other bookkeeping information (e.g., timestamp, the ID of ONU PMHD ME 504, the ID of OLT CT 204, the bin collection interval, etc.) as a record in circular archive 612 (block 714). Furthermore, OLT CT 204 may obtain the sum of the output of adder 610 and the value of total accumulator 614 and store the sum in total accumulator 614 (block 714). Thereafter, OLT CT 204 may reset bin accumulator 606 to zero (block 716) and reset the bin reference 608 to the value of current accumulator 508 obtained at block 712 (block 718). Process 700 may then return to block 704. In this manner, performance monitoring data may be stored at various granularity, by setting a bin timer 602 to a shorter time interval than the PCT time interval. The data may then be used to analyze performance in PON environment 100, in a manner not possible with data collected only at PCT intervals.

Figure 8:
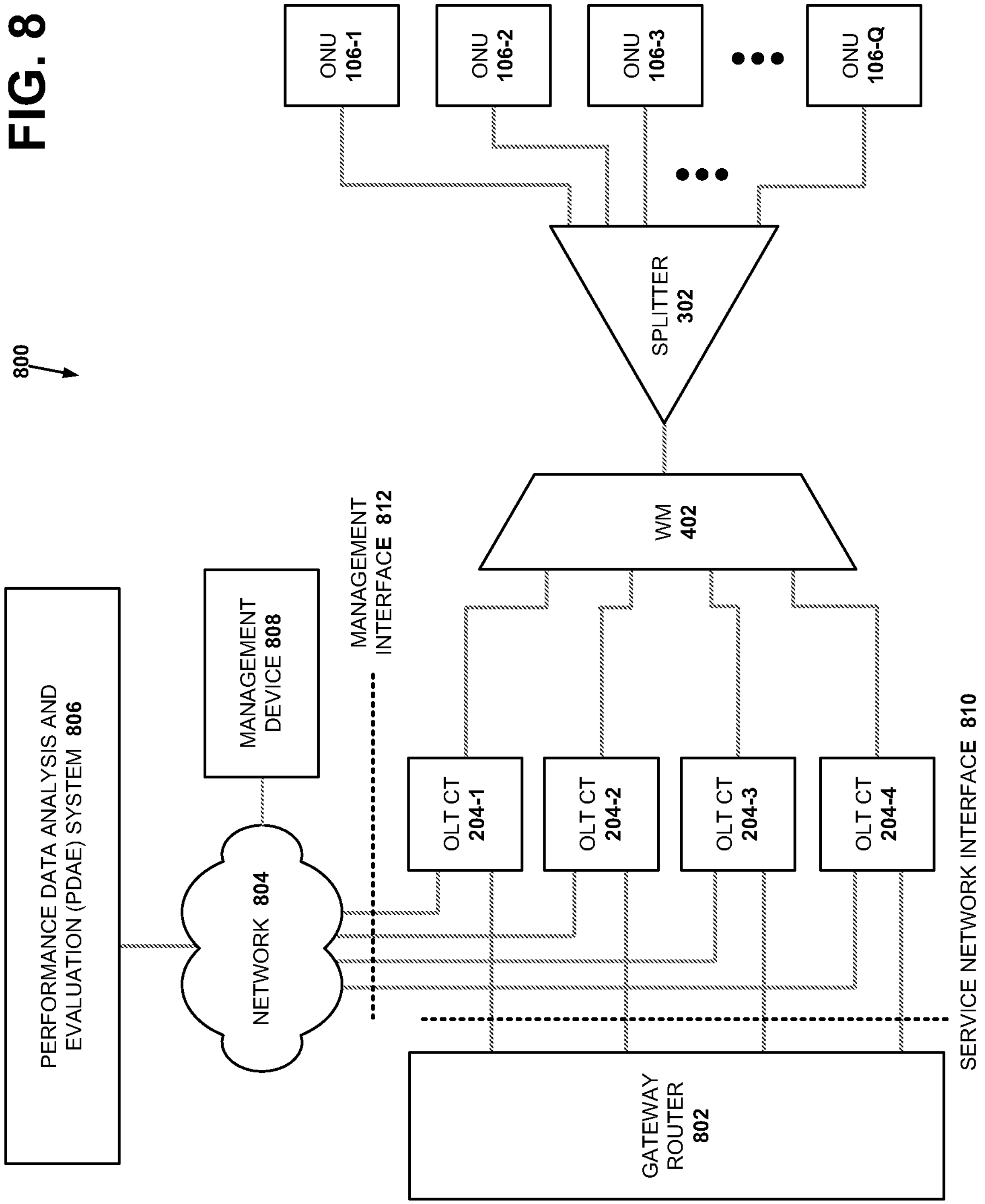
FIG. 8 illustrates an example flexible performance monitoring data archiving system, according to an implementation.

FIG. 8 illustrates an example flexible performance monitoring data archiving system 800, according to an implementation. As shown, system 800 may include a gateway router 802, a local network 804, a Performance Data Analysis and Evaluation (PDAE) system 806, one or more management device 808, and components of FIG. 4 (e.g., OLT CTs 204, WDM 402, splitter 302, and ONUs 106). Depending on the implementation, system 800 may include additional, fewer, different, or a different arrangement of components than those depicted in FIG. 8.

Gateway router 802 may provide a point of entry/exit for packets to/from OLT CTs 204 and network 804 via a service network interface 810. Network 804 may provide connectivity to components of system 800, such as PDAE system 806, management device 808, and OLT CTs 204. PDAE system 806 may provide mechanisms for accessing performance monitoring data, conducting analysis, and troubleshooting. For example, a network operator may use PDAE system 806 to access data (e.g., packet errors) in circular archive 612 collected over a particular time interval by a set of ONUs 106, view the data (e.g., as graphs, charts, etc.), obtain data statistics, etc. In one implementation, PDAE system 806 may permit a network operator who accesses PDAE system 806 via a client application (e.g., a browser) to use the flexible performance monitoring data archiving capabilities of one or more OLT CTs 204 through management interface 812. For example, a network operator may set the bin interval for one or more OLT CTs 204, stop the data archiving process, restart the data archiving process, etc. Management device 808 may include a client application for accessing PDAE system 806 and using PDAE system 806.

Figure 9:
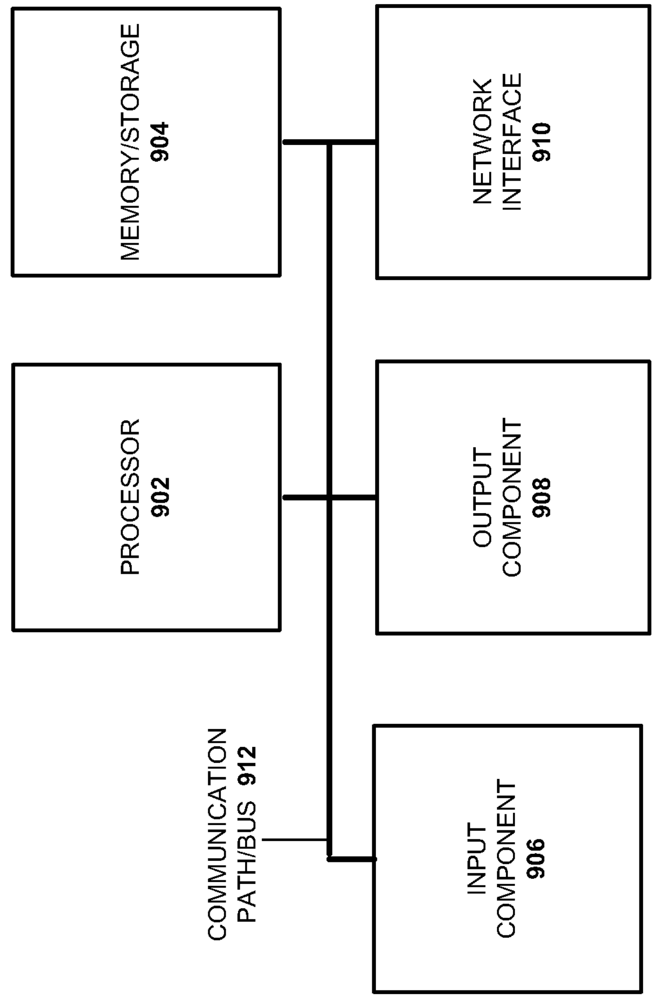
FIG. 9 depicts example functional components of a network device according to an implementation.

FIG. 9 depicts exemplary components of an exemplary network device 900. Network device 900 may correspond to or be included in any of the devices and/or components illustrated in FIGS. 1-6 and 8 (e.g., OLT elements 104, OLT CT 204, ONU 106, gateway router 802, network 804, PDAE system 806, etc.). In some implementations, network devices 900 may be part of a hardware network layer on top of which other network layers and network functions (NFs) may be implemented.

As shown, network device 900 may include a processor 902, memory/storage 904, input component 906, output component 908, network interface 910, and communication path 912. In different implementations, network device 900 may include additional, fewer, different, or different arrangement of components than the ones illustrated in FIG. 9. For example, network device 900 may include line cards, switch fabrics, modems, etc.

Processor 902 may include a processor, a microprocessor, an Application Specific Integrated Circuit (ASIC), a Field Programmable Gate Array (FPGA), programmable logic device, chipset, application specific instruction-set processor (ASIP), system-on-chip (SoC), central processing unit (CPU) (e.g., one or multiple cores), microcontrollers, and/or other processing logic (e.g., embedded devices) capable of controlling network device 900 and/or executing programs/instructions.

Memory/storage 904 may include static memory, such as read only memory (ROM), and/or dynamic memory, such as random access memory (RAM), or onboard cache, for storing data and machine-readable instructions (e.g., programs, scripts, etc.). Memory/storage 904 may also include a CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 904 may be external to and/or removable from network device 900. Memory/storage 904 may include, for example, a Universal Serial Bus (USB) memory stick, a dongle, a hard disk, off-line storage, a Blu-Ray® disk (BD), etc. Memory/storage 904 may also include devices that can function both as a RAM-like component or persistent storage, such as Intel® Optane memories. Depending on the context, the term "memory," "storage," "storage device," "storage unit," and/or "medium" may be used interchangeably. For example, a "computer-readable storage device" or "computer-readable medium" may refer to both a memory and/or storage device.

Input component 906 and output component 908 may provide input and output from/to a user to/from network device 900. Input/output components 906 and 908 may include a display screen, a keyboard, a mouse, a speaker, a microphone, a camera, a DVD reader, USB lines, and/or other types of components for obtaining, from physical events or phenomena, to and/or from signals that pertain to network device 900.

Network interface 910 may include a transceiver (e.g., a transmitter and a receiver) for network device 900 to communicate with other devices and/or systems. For example, via network interface 910, network device 900 may communicate over a network, such as the Internet, an intranet, cellular, a terrestrial wireless network, a satellite-based network, optical network, etc. Network interface 910 may include a modem, an Ethernet interface to a LAN, and/or an interface/connection for connecting network device 900 to other devices.

Communication path or bus 912 may provide an interface through which components of network device 900 can communicate with one another.

Network device 900 may perform the operations described herein in response to processor 902 executing software instructions stored in a non-transient computer-readable medium, such as memory/storage 904. The software instructions may be read into memory/storage 904 from another computer-readable medium or from another device via network interface 910. The software instructions stored in memory/storage 904, when executed by processor 902, may cause processor 902 to perform one or more of the processes that are described herein.

In this specification, various preferred embodiments have been described with reference to the accompanying drawings. It will be evident that modifications and changes may be made thereto, and additional embodiments may be implemented, without departing from the broader scope of the invention as set forth in the claims that follow. The specification and drawings are accordingly to be regarded in an illustrative rather than restrictive sense.

In the above, while series of actions have been described with reference to FIG. 7, the order of the actions may be modified in other implementations. In addition, non-dependent actions may represent actions that can be performed in parallel and in different orders. Furthermore, each of actions illustrated may include one or more other actions.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A device comprising:

a processor to:

when an Optical Network Unit (ONU) timer reaches an ONU time interval, obtain a value from a history register, in an ONU, which stores a first sum of performance monitoring data at the end of a prior ONU time interval, by issuing a first ONU Management Control Interface (OMCI) command to the ONU; and store, in a bin accumulation register, the obtained value; and when a collection timer reaches a collection time interval, obtain a second sum of performance monitoring data collected by the ONU after the prior ONU time interval, by issuing a second OMCI command to the ONU;

subtract a reference value, stored in a reference register, from the second sum to produce a subtracted value;

adjust the subtracted value by adding a value stored in the bin accumulation register to the subtracted value; and store the adjusted result.

2. The device of claim 1, wherein when the collection timer reaches the collection time interval, the processor is further configured to:

store the second sum in the reference register.

3. The device of claim 1, wherein when the collection timer reaches the collection time interval, the processor is further configured to:

set the bin accumulation register to zero.

4. The device of claim 1, wherein the processor is further configured to:

set the collection timer to a length of time specified in a message from another device via a management interface.

5. The device of claim 1, wherein the device comprises an optical line terminal (OLT) channel termination (CT) device.

6. The device of claim 1, wherein when the collection timer reaches the collection time interval, obtain a third sum of the adjusted value and a value stored at a total accumulator; and store the third sum in the total accumulator.

7. The device of claim 1, wherein when the processor stores the adjusted result, the processor is configured to:

store the adjusted result in a circular archive.

8. The device of claim 1, wherein when the ONU timer reaches the ONU time interval, the ONU is configured to:

store, in the history register, a third sum of performance monitoring data, collected by the ONU.

9. A method comprising:

when an Optical Network Unit (ONU) timer reaches an ONU time interval, obtaining a value from a history register, in an ONU, which stores a first sum of performance monitoring data at the end of a prior ONU time interval, by issuing a first ONU Management Control Interface (OMCI) command to the ONU; and storing, in a bin accumulation register, the obtained value; and when a collection timer reaches a collection time interval, obtaining a second sum of performance monitoring data collected by the ONU after the prior ONU time interval, by issuing a second OMCI command to the ONU;

subtracting a reference value, stored in a reference register, from the second sum to produce a subtracted value;

adjusting the subtracted value by adding a value stored in the bin accumulation register to the subtracted value; and storing the adjusted result.

10. The method of claim 9, further comprising, wherein when the collection timer reaches the collection time interval, storing the second sum in the reference register.

11. The method of claim 9, further comprising, wherein when the collection timer reaches the collection time interval, setting the bin accumulation register to zero.

12. The method of claim 9, further comprising:

setting the collection timer to a length of time specified in a message from another device via a management interface.

13. The method of claim 9, wherein storing the adjusted result includes:

storing the adjusted result by an optical line terminal (OLT) channel termination (CT) device.

14. The method of claim 9, further comprising, when the collection timer reaches the collection time interval, obtaining a third sum of the adjusted value and a value stored at a total accumulator; and storing the third sum in the total accumulator.

15. The method of claim 9, wherein storing the adjusted result includes:

storing the adjusted result in a circular archive.

16. The method of claim 9, further comprising, wherein when the ONU timer reaches the ONU time interval, storing, in the history register included in the ONU, a third sum of performance monitoring data, collected by the ONU.

17. A non-transitory computer-readable medium comprising processor-executable instructions which, when executed by a processor in a device, cause the processor to:

when an Optical Network Unit (ONU) timer reaches an ONU time interval, obtain a value from a history register, in an ONU, which stores a first sum of performance monitoring data at the end of a prior ONU time interval, by issuing a first ONU Management Control Interface (OMCI) command to the ONU; and store, in a bin accumulation register, the obtained value; and when a collection timer reaches a collection time interval, obtain a second sum of performance monitoring data collected by the ONU after the prior ONU time interval, by issuing a second OMCI command to the ONU;

subtract a reference value, stored in a reference register, from the second sum to produce a subtracted value;

adjust the subtracted value by adding a value stored in the bin accumulation register to the subtracted value; and store the adjusted result.

18. The non-transitory computer-readable medium of claim 17, wherein when the ONU timer reaches the ONU time interval, the processor is configured to:

store, in the history register, a third sum of performance monitoring data, collected by the ONU.

19. The non-transitory computer-readable medium of claim 17, wherein when the collection timer reaches the collection time interval, the processor is further configured to:

set the bin accumulation register to zero.

20. The non-transitory computer-readable medium of claim 17, wherein the processor is further configured to:

set the collection timer to a length of time specified in a message from another device via a management interface.

* * * * *